US010859780B2

(12) United States Patent
Ishimura et al.

(10) Patent No.: US 10,859,780 B2
(45) Date of Patent: Dec. 8, 2020

(54) OPTICAL FIBER UNIT, OPTICAL FIBER CABLE, AND METHOD FOR MANUFACTURING OPTICAL FIBER UNIT

(71) Applicants: FURUKAWA ELECTRIC CO., LTD., Tokyo (JP); NIPPON TELEGRAPH AND TELEPHONE CORPORATION, Tokyo (JP)

(72) Inventors: Tomohiro Ishimura, Tokyo (JP); Yutaka Hoshino, Tokyo (JP); Shinya Hamaguchi, Ibaraki (JP); Naoki Nakagawa, Ibaraki (JP); Yohei Endo, Ibaraki (JP); Yukihiko Shibata, Ibaraki (JP); Yuji Aoyagi, Ibaraki (JP)

(73) Assignees: FURUKAWA ELECTRIC CO., LTD., Tokyo (JP); NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/447,320

(22) Filed: Jun. 20, 2019

(65) Prior Publication Data
US 2019/0302384 A1    Oct. 3, 2019

Related U.S. Application Data

(63) Continuation of application No. PCT/JP2016/088170, filed on Dec. 21, 2016.

(51) Int. Cl.
*G02B 6/04* (2006.01)
*G02B 6/44* (2006.01)
*G02B 6/06* (2006.01)

(52) U.S. Cl.
CPC .............. *G02B 6/443* (2013.01); *G02B 6/04* (2013.01); *G02B 6/06* (2013.01); *G02B 6/44* (2013.01)

(58) Field of Classification Search
CPC ...................................... G02B 6/443
See application file for complete search history.

(56) References Cited

U.S. PATENT DOCUMENTS 9,869,838 B2 * 1/2018 Kaji ................ G02B 6/4433
10,007,079 B2 * 6/2018 Takeda .............. G02B 6/44
(Continued)

FOREIGN PATENT DOCUMENTS

CA    2941962 A1    11/2016
CN    101765797 A    6/2010
(Continued)

OTHER PUBLICATIONS

Office Action issued in Taiwan Patent Application No. 105142693 dated Feb. 23, 2018.
(Continued)

*Primary Examiner* — Sung H Pak
(74) *Attorney, Agent, or Firm* — Marshall, Gerstein & Borun LLP (57) ABSTRACT

Two bundle materials are provided on the outer periphery of a plurality of optical fibers. The bundle materials are twisted back while reversing the winding from front to back and vice versa to thus wind the bundle materials around the plurality of optical fibers. That is, the bundle materials are not wound spirally around the plurality of optical fibers. The bundle materials are bonded at a bonding portion where both bundle materials intersect. The bonding portion is provided along a center line of an optical fiber unit. The bundle materials are arranged in ranges which are each approximately 180° and partitioned by the center line.

9 Claims, 7 Drawing Sheets

(56) References Cited

U.S. PATENT DOCUMENTS

| | | | |
|---|---|---|---|
| 10,345,516 B2* | 7/2019 | Sajima | G02B 6/4403 |
| 10,409,022 B2* | 9/2019 | Kaji | G02B 6/441 |
| 10,488,610 B2* | 11/2019 | Ito | G02B 6/4403 |
| 2008/0186555 A1 | 8/2008 | Nakatsu | |
| 2010/0189396 A1 | 7/2010 | Hashimoto et al. | |
| 2016/0223769 A1 | 8/2016 | Ito et al. | |
| 2016/0356974 A1* | 12/2016 | Bringuier | B23K 26/21 |
| 2017/0115451 A1 | 4/2017 | Sajima et al. | |
| 2017/0139168 A1 | 5/2017 | Kaji et al. | |

FOREIGN PATENT DOCUMENTS

| | | |
|---|---|---|
| JP | 09-026534 A | 1/1997 |
| JP | 2008-191555 A | 8/2008 |
| JP | 2010-095666 A | 4/2010 |
| JP | 2011-169939 A | 9/2011 |
| JP | 2012-088454 A | 5/2012 |
| JP | 2012-212097 A | 11/2012 |
| JP | 2013-088547 A | 5/2013 |
| JP | 2016-218267 A | 12/2016 |
| JP | 2016-218401 A | 12/2016 |
| TW | 201606376 A | 2/2016 |
| WO | WO-2015/052951 A1 | 4/2015 |
| WO | WO-2015/053146 A1 | 4/2015 |
| WO | WO-2016/185767 A1 | 11/2016 |
| WO | WO-2016/189922 A1 | 12/2016 |

OTHER PUBLICATIONS

International Search Report issued in PCT Patent Application No. PCT/JP2016/088170 dated Mar. 28, 2017.

Office Action issued in Japanese Patent Application No. 2015-128022 dated Oct. 3, 2018.

Office Action issued in Japanese Patent Application No. 2015-128022 dated Apr. 19, 2018.

Reconsideration Report by Examiner before Appeal issued in Japanese Patent Application No. 2015-128022 dated Mar. 14, 2019.

Ishimura Tomohiro et al., "Optical Fiber Unit, Optical Fiber Cable, and Manufacturing Method for Optical Fiber Unit," Japanese Patent Publication No. 2017-9925 (Jan. 12, 2017).

Office Action isued in Japanese Patent Application No. 2018-557464 dated Sep. 23, 2020.

Office Action issued in Chinese Patent Application No. 201680091693 dated Sep. 14, 2020.

* cited by examiner

OPTICAL FIBER UNIT, OPTICAL FIBER CABLE, AND METHOD FOR MANUFACTURING OPTICAL FIBER UNIT

TECHNICAL FIELD

The present invention relates to an optical fiber unit that enables an easy branching operation, and the like.

BACKGROUND

With the widespread of the Internet in recent years, FTTH (Fiber To The Home) that provides fast communication service by installing optical fiber cables directly into common households is rapidly spreading. In general, optical fiber cables used for FTTH contain an assembly of optical fibers for large-capacity data communications.

Here, an assembly of optical fibers is formed by assembling a plurality of optical fiber ribbons or the like, for example. Also, such an assembly of optical fibers bundled together by a bundle material is generally known as an optical fiber unit.

As such an optical fiber unit, for example, Japanese Unexamined Patent Application Publication No. H9-26534 (JP-A-H9-26534) (Patent Document 1) proposes a structure in which two strings of bundle materials are spirally wound around a plurality of optical fibers in directions opposite to each other.

Also, Japanese Unexamined Patent Application Publication No. 2011-169939 (JP-A-2011-169939) (Patent Document 2) proposes an optical fiber unit in which an assembly of optical fibers is bundled together by spirally winding a plurality of bundle materials around the assembly of optical fibers in a longitudinal direction, and the bundle materials are bonded at intersections of the two bundle materials.

However, if two bundle materials are used being wound in opposite directions and bonded at the intersections as in Patent Documents, it is difficult to detach the bonding portions in branching operations. Even if the bonding portions at the intersections are cut, it is still necessary to unwind the bundle materials in opposite directions respectively, which leads to a problem of time-consuming removal of the bundle materials.

SUMMARY

The present invention was made in view of such problems. Its object is to provide an optical fiber unit that enables an easy branching operation, and the like.

To achieve the above object, a first invention is an optical fiber unit including a plurality of optical fibers and a plurality of bundle materials that are disposed on an outer periphery of the plurality of the optical fibers. Neither of the bundle materials is spirally wound around the outer periphery of the optical fibers. At least one of the bundle materials is twisted to wind around the outer periphery of the plurality of optical fibers while inverting its winding direction back and forth, and the bundle materials are bonded together at intersections of the bundle materials.

A length of a bonding portion of the bundle materials is preferably between 5 mm and 20 mm.

A peeling strength of the bonding portion of the bundle materials is preferably between 0.01 N and 2.0 N.

The bundle material may be resin tape and the bonding portion of the bundle materials may be bonded by heat fusion.

The optical fiber may be an optical fiber ribbon.

According to the first invention, neither of the plurality of the bundle materials is spirally wound, and at least one of the bundle materials is twisted while inverting its winding direction back and forth and the bundle materials are bonded together at intersections of the bundle materials. Thus, pulling the bundle material that has been twisted back can easily detach the bonding at the bonding portion. Also, after detaching the bonding portion, the optical fibers inside can be taken out without rewinding the bundle materials. Thus, the performance of branching operations is good.

In particular, if the length of the bonding portion of the bundle materials is 5 mm or more, the bonding portion cannot be detached during manufacturing and the like, and if the length of the bonding portion of the bundle materials is 20 mm or less, the optical fibers can be prevented from coming off, which may occur if a straight portion of the bonding portion is too long.

Also, if the peeling strength of the bonding portion of the bundle materials is between 0.01N and 2.0N, the bonding portion cannot be detached during manufacturing and the like and, also, the bonding portion can be detached easily in branching operations.

Also, if the bundle material is resin tape and the bonding portion of the bundle materials is bonded by heat fusion, then the optical fiber unit can be manufactured easily.

Also, if the optical fiber is an optical fiber ribbon formed of a plurality of primary optical fibers, then an optical fiber unit in which a plurality of optical fiber ribbons are bundled can be easily manufactured.

A second invention is an optical fiber cable including a plurality of the optical fiber units according to the first invention, a tension member, and an outer jacket that is provided on an outer periphery of the optical fiber units.

According to the second invention, an optical fiber cable that is excellent in branching operation performance can be obtained.

A third invention is a method for manufacturing an optical fiber unit. The method includes a step of bonding a bundle material with the other at a bonding portion on a first side of optical fibers and moving the bundle materials and the optical fibers relatively in a direction perpendicular to a longitudinal direction of the optical fibers so that the optical fibers contact with the bonding portion on the first side and the bundle materials move to a second side of the optical fibers, and a step of bonding the bundle material with the other at a bonding portion on the second side of the optical fibers and moving the bundle materials and the optical fibers relatively in the direction perpendicular to the longitudinal direction of the optical fibers so that the optical fibers contact with the bonding portion on the second side and the bundle materials move to the first side of the optical fibers. The method repeats the above steps while bundling the plurality of optical fibers and feeding the plurality of bundle materials around an outer periphery of the optical fibers, According to the third invention, an optical fiber unit that is excellent in branching operation performance can be easily obtained.

The present invention can provide an optical fiber unit that enables an easy branching operation, and the like.

BRIEF DESCRIPTION OF DRAWINGS

FIG. 4A is a perspective view showing an optical fiber unit 1a.

FIG. 4B is a cross sectional view showing the optical fiber unit 1a.

FIG. 6B is a view showing an optical fiber cable 10a.

DETAILED DESCRIPTION

Figure 1A:
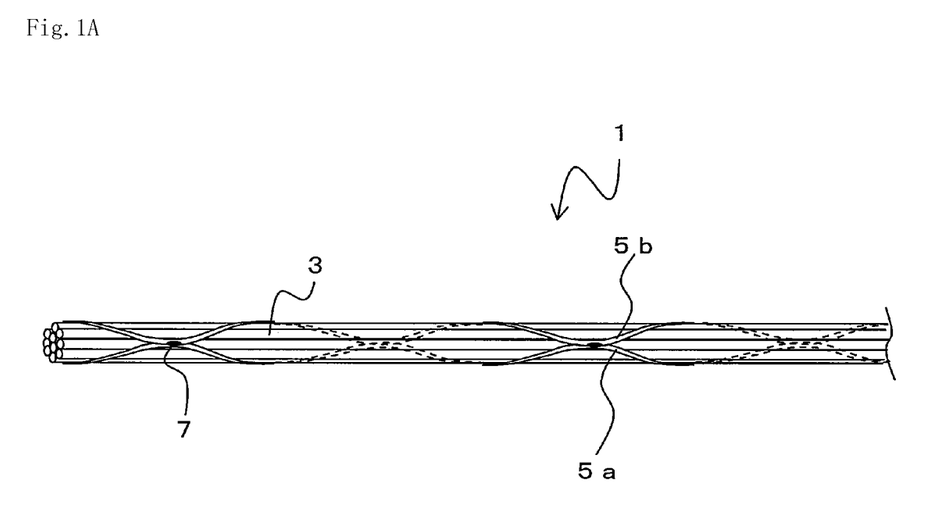
FIG. 1A is a perspective view showing an optical fiber unit 1.
Figure 1B:
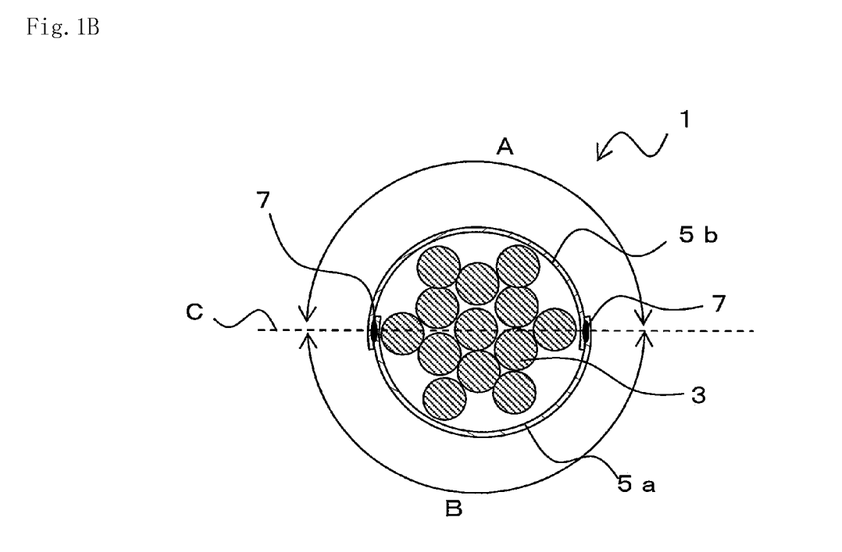
FIG. 1B is a cross sectional view showing the optical fiber unit 1.

Hereinafter, some embodiments of the present invention will be described with reference to the accompanying drawings. FIG. 1A is a perspective view showing an optical fiber unit 1, and FIG. 1B is a cross sectional view taken perpendicularly to a longitudinal direction of the optical fiber unit 1. The optical fiber unit 1 includes optical fibers 3, bundle materials 5a, 5b, and so on.

The number of the optical fibers 3 is not limited to the illustrated examples. The two bundle materials 5a, 5b are provided on an outer periphery of the plurality of optical fibers 3. The number of the bundle materials is preferably two, or may be otherwise as long as the number is more than one. The bundle materials 5a, 5b are, for example, resin tape.

The bundle materials 5a, 5b are twisted to wind around the outer periphery of the plurality of optical fibers 3 while inverting its winding direction back and forth. That is, the bundle materials 5a, 5b are not wound spirally around the outer periphery of the plurality of optical fibers 3.

More specifically, as shown in FIG. 1B, the bundle material 5a is provided on the outer periphery of the optical fibers 3 being twisted while inverting its winding direction back and forth within a range B in a circumference direction of the optical fiber unit 1. Similarly, the bundle material 5b is provided on the outer periphery of the optical fibers 3 being twisted while inverting its winding direction back and forth within a range A in the circumference direction of the optical fiber unit 1.

The bundle materials 5a, 5b are bonded at a bonding portion 7 where the bundle materials 5a, 5b intersect. In the illustrated example, the bonding portions 7 on both sides are provided on a center line C of the optical fiber unit 1. Also, the bundle materials 5a, 5b are disposed within the ranges A and B, respectively, which are each approximately 180° and partitioned by the center line C (the bundle materials 5a, 5b partially overlap each other). However, a winding range for the bundle materials 5a, 5b is not limited to 180°.

In this way, the bonding portion 7 can be detached easily by pulling the bundle materials 5a, 5b in opposite directions. Also, after the bonding portion 7 is detached, the bundle materials 5a, 5b are separated and the optical fibers 3 inside can easily be taken out.

For example, in FIG. 1B, when the bonding portion 7 on a right side is detached, the bundle materials 5a, 5b are bonded only at the bonding portion 7 on the left side, and this can completely open a right half of the bundle materials 5a, 5b. Thus, it is unnecessary to rewind the bundle materials 5a, 5b unlike in a case in which the bundle materials 5a, 5b are spirally wound around.

The length of the bonding portion 7 in the longitudinal direction of the optical fiber unit 1 is preferably between 5 mm and 20 mm. If the length of the bonding portion 7 is less than 5 mm, the bonding portion 7 may be detached during manufacturing and the like. Also, if the length of the bonding portion 7 is more than 20 mm, a straight range where the bundle materials 5a, 5b are bonded along the same direction as the optical fibers 3 becomes long and thus the optical fibers 3 may easily come out of the optical fiber unit 1, which deteriorates the handling performance.

Also, the maximum peeling strength of the bonding portion 7 is preferably between 0.01N and 2.0N. The peeling strength is a strength value measured in the peeling test in JIS K 6854. If the maximum peeling strength is less than 0.01N, the bonding portion 7 may be detached during manufacturing. Also, if the maximum peeling strength is more than 2.0N, the bonding force is too strong that it is difficult to detach the bonding portion 7 of the bundle materials 5a, 5b, which may damage the optical fibers 3.

Next, a method for manufacturing the optical fiber unit 1 will be described. First, the plurality of optical fibers 3 supplied from an optical fiber supplier are bundled together to form a bundle of the optical fibers 3. Next, the two bundle materials 5a, 5b are supplied on an outer periphery of the bundle of the optical fibers.

Figure 2A:
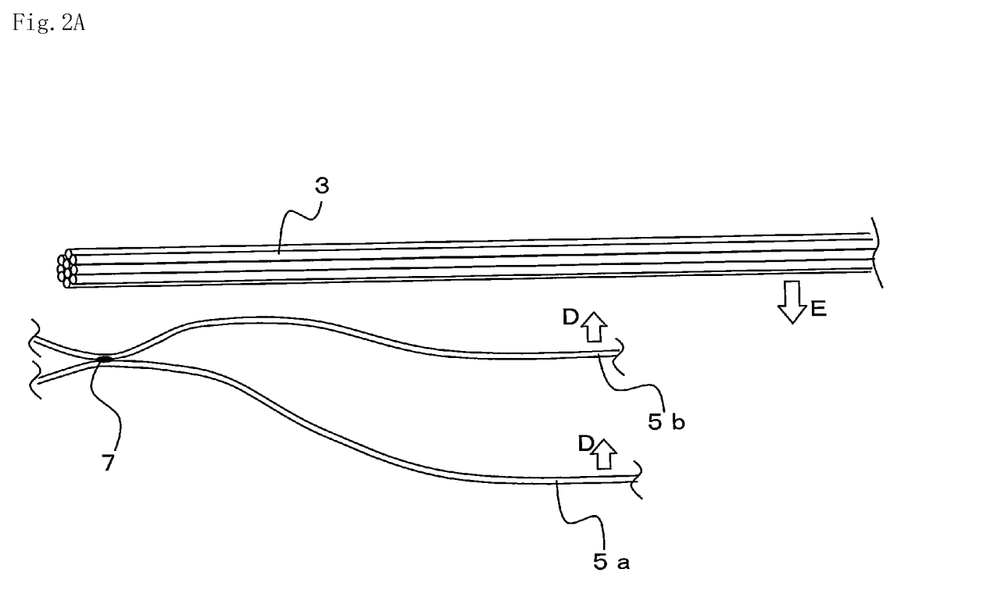
FIG. 2A is a view showing a step of manufacturing the optical fiber unit 1.

While feeding the two bundle materials 5a, 5b continuously, as shown in FIG. 2A, the bundle materials 5a, 5b are disposed first on a first side of the optical fibers 3 (on a lower side in the drawing). Then, a part of the bundle materials 5a, 5b are bonded at the bonding portion 7. For example, holding the bundle materials 5a, 5b with a heated tool may thermally fuse the two together easily. The bundle materials 5a, 5b may be bonded by other means such as an adhesive agent.

Next, in a direction perpendicular to the longitudinal direction of the optical fibers 3 (the vertical direction in the drawing), the bundle materials 5a, 5b and the optical fibers 3 are moved relatively toward each other (arrows D, E in the drawing) so as to make the optical fibers 3 contact with the bonding portion 7 on the first side and to move the bundle materials 5a, 5b to a second side of the optical fibers 3 (on an upper side in the drawing). The relative movement between the bundle materials 5a, 5b and the optical fibers 3 may be by either or both of the two.

Figure 2B:
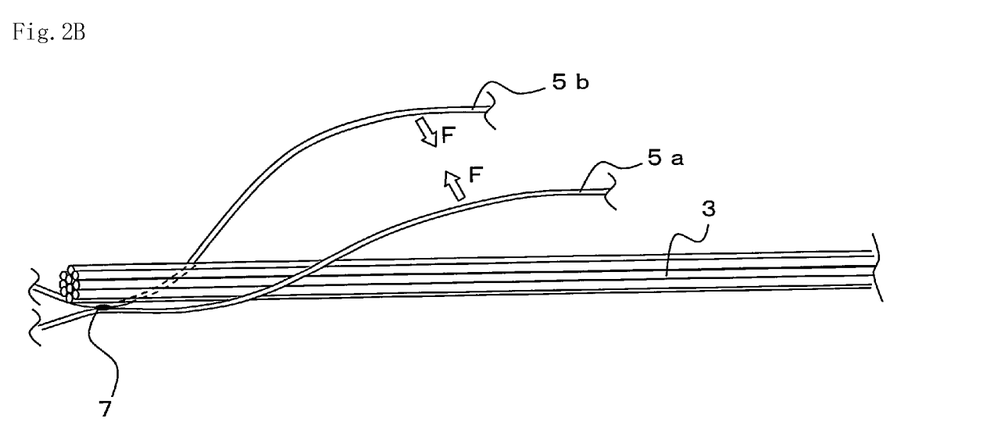
FIG. 2B is a view showing a step of manufacturing the optical fiber unit 1.

Next, as shown in FIG. 2B, the bundle materials 5a, 5b approach each other (arrows F in the drawing) on the second side of the optical fibers 3 (on the upper side in the drawing).

Figure 3A:
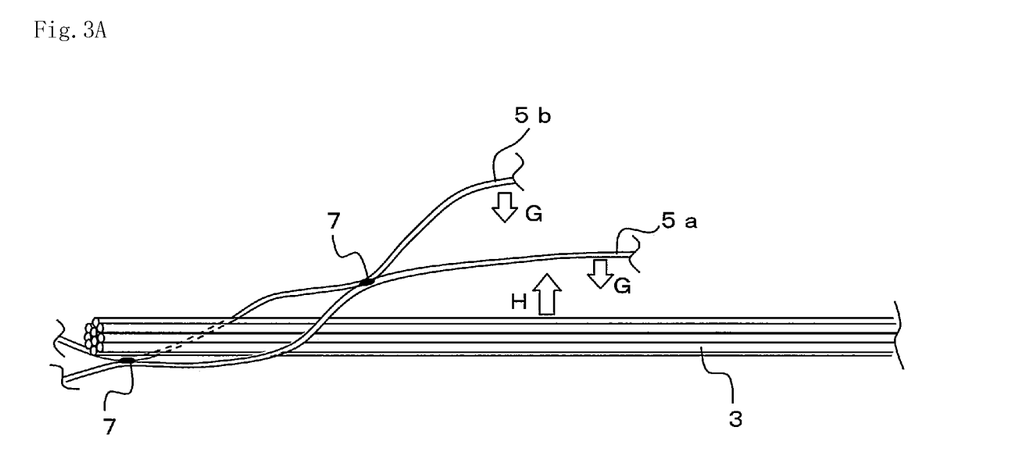
FIG. 3A is a view showing a step of manufacturing the optical fiber unit 1.

Further, as shown in FIG. 3A, the bundle materials 5a, 5b are bonded together. After bonding the bundle materials 5a, 5b together, the bundle materials 5a, 5b are twisted back in opposite directions (the bundle materials 5a, 5b are separated away in directions opposite to the approaching directions F in FIG. 2B). Then, the bundle materials 5a, 5b and the optical fibers 3 are moved relatively toward each other (arrows G, H in the drawing) so as to make the optical fibers 3 contact with the bonding portion 7 that has been just bonded on the second side, and then the bundle materials 5a, 5b are moved to the first side of the optical fibers 3 (downward in the drawing).

Figure 3B:
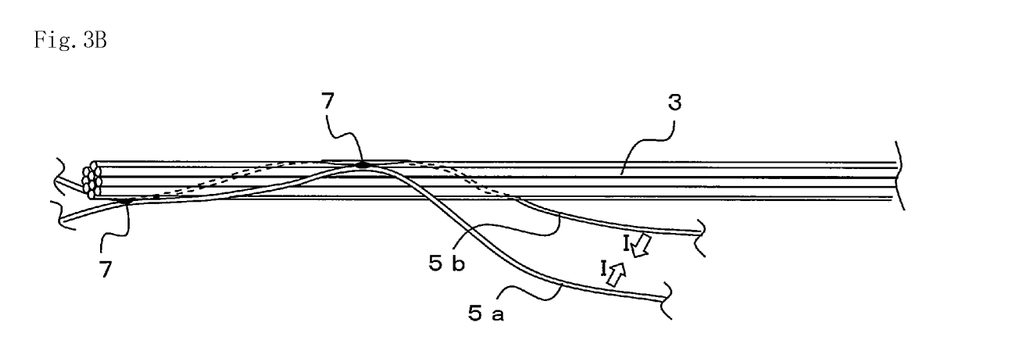
FIG. 3B is a view showing a step of manufacturing the optical fiber unit 1.

Next, as shown in FIG. 3B, the bundle materials 5a, 5b approach each other on the first side (on the lower side in the drawing) of the optical fibers 3 (arrows I in the drawing).

Figure 3C:
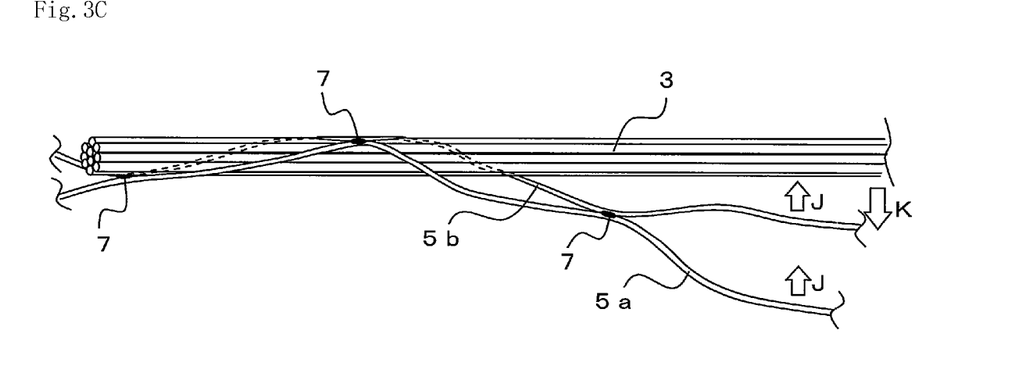
FIG. 3C is a view showing a step of manufacturing the optical fiber unit 1.

Then, as shown in FIG. 3C, after bonding the bundle materials 5a, 5b, the bundle materials 5a, 5b are twisted back in opposite directions (the bundle materials 5a, 5b are separated away in directions opposite to the approaching directions I in FIG. 3B). Next, the bundle materials 5a, 5b and the optical fibers 3 are moved relatively toward each other (arrows J, K in the drawing) so as to make the optical fibers 3 contact with the bonding portion 7 that has been just bonded on the first side, and then the bundle materials 5a, 5b are moved to the second side of the optical fibers 3 (upward in the drawing).

By repeating the above processes, the optical fiber unit 1 can be manufactured without spirally winding (without continuously winding for a plurality of rounds in the same direction) the bundle materials 5a, 5b around the outer periphery of the optical fibers 3.

Changing a size of the tool that holds the bundle materials 5a, 5b can adjust the length of the bonding portion 7. Also, changing a feeding speed of the bundle materials 5a, 5b and timing for the relative movement between the bundle materials 5a, 5b and the optical fibers 3 can adjust a pitch of the bonding portions 7.

Although a method in which both of the bundle materials 5a, 5b are twisted while inverting its winding direction back and forth is described in the above descriptions, the present invention is not limited thereto. In the present invention, at least one of the plurality of bundle materials should be twisted while inverting its winding direction back and forth.

Figure 4A:
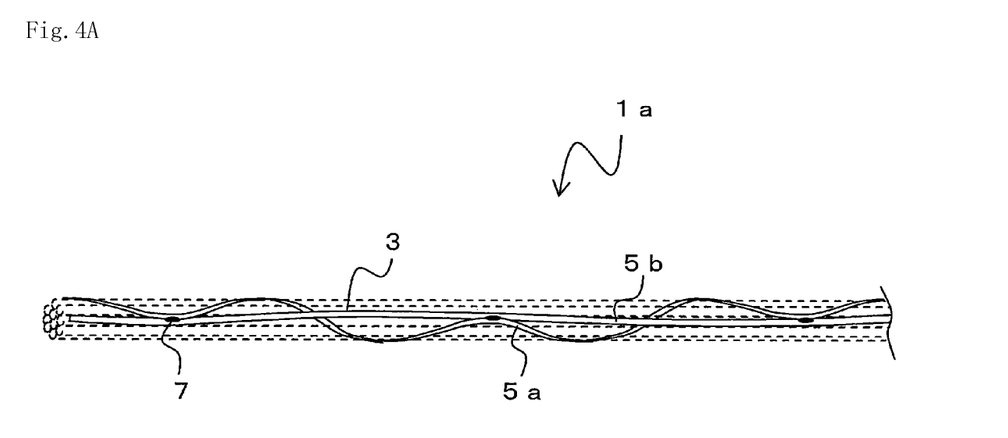

FIG. 4A is a view showing an optical fiber unit 1a. The optical fiber unit 1a has approximately the same structure as the optical fiber unit 1 except that only the bundle material 5a is twisted while inverting its winding direction back and forth and the bundle material 5b is disposed in a substantially straight line along a longitudinal direction of the optical fiber unit 1a.

Figure 4B:
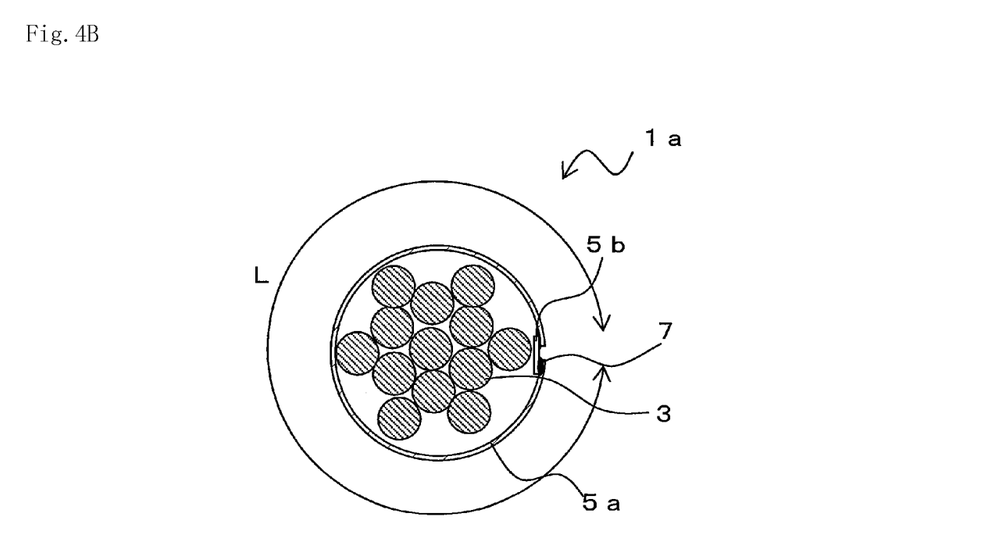

As shown in FIG. 4B, the bundle material 5a is provided within a range L in a circumference direction of the optical fiber unit 1a while inverting its winding direction back and forth, whereas the position of the bundle material 5b in the circumference direction hardly changes. That is, the bundle material 5a is twisted while inverting its winding direction back and forth in a 360° range of the outer periphery of the optical fibers 3.

Also in this case, the optical fiber unit 1a can be obtained by repeatedly bonding the bundle materials 5a, 5b and relatively moving the positions of the bundle materials 5a, 5b and the optical fibers 3.

Also, although the above-mentioned embodiments show examples in which a plurality of single-cored optical fibers 3 are bundled by the bundle materials 5a, 5b, this may be applied to a plurality of optical fiber ribbons.

Figure 5A:
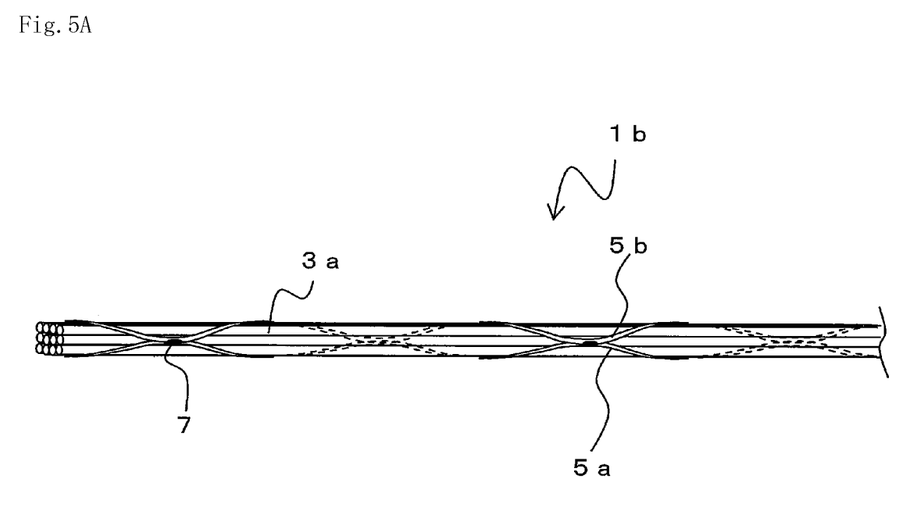
FIG. 5A is a perspective view showing an optical fiber unit 1b.
Figure 5B:
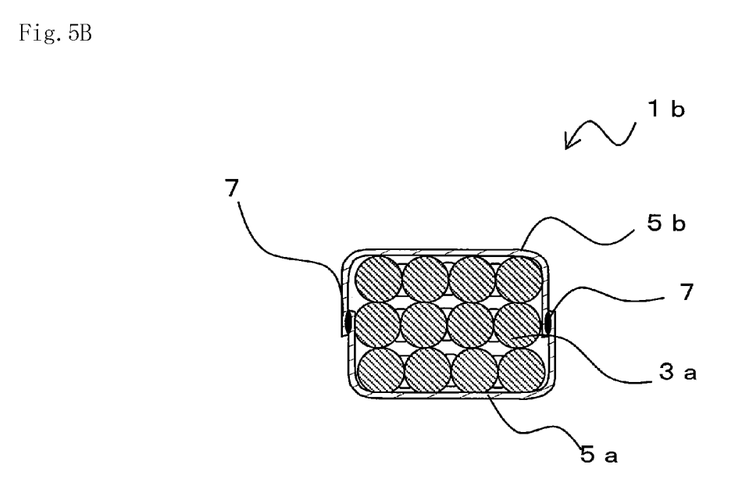
FIG. 5B is a cross sectional view showing the optical fiber unit 1b.

FIG. 5A is a perspective view showing an optical fiber unit 1b and FIG. 5B is a cross sectional view taken perpendicularly to a longitudinal direction of the optical fiber unit 1b. The optical fiber unit 1b has an approximately similar structure to the optical fiber unit 1 except that optical fiber ribbons 3a are applied in place of the single-cored optical fibers 3. Although the illustrated example shows four-cored optical fiber ribbon 3a, the number of cores is not limited thereto. Also, although the example shows the optical fiber unit 1b having three optical fiber ribbons 3a, the number of the optical fiber ribbons 3a is not limited to the illustrated example.

Also for the optical fiber unit 1b, like the optical fiber unit 1a, the bundle material 5a may be provided around approximately the entire circumference of the optical fiber unit 1b in the circumference direction while inverting its winding direction back and forth, and the position of the bundle material 5b in the circumference direction may hardly change.

Figure 6A:
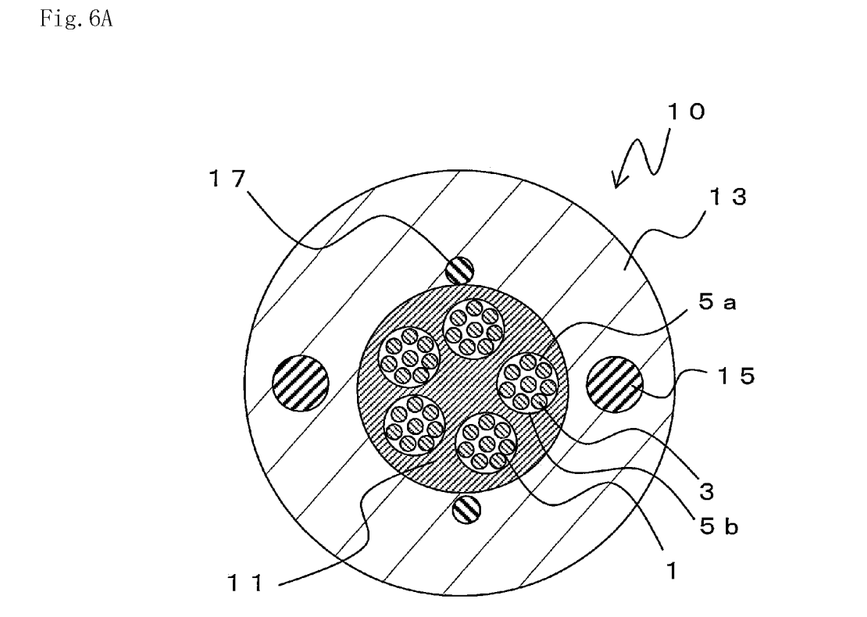
FIG. 6A is a view showing an optical fiber cable 10.

Next, an optical fiber cable using the optical fiber unit 1 will be described. In the descriptions hereinafter, an example in which the optical fiber unit 1 is used will be shown. However, the optical fiber unit 1a or 1b may also be applicable. FIG. 6A is a cross sectional view showing an optical fiber cable 10. A plurality of the optical fiber units 1 obtained from the above-mentioned method are twisted together and a buffer body 11, which is a propylene yarn or the like, is provided around an outer periphery of the optical fiber units 1 to form a cable core.

Furthermore, tension members 15 made of strength member or the like and ripcords 17 are disposed on an outer periphery of the obtained cable core. In addition, an outer jacket 13 is extrusion coated on an outer periphery of the cable core which is formed of the optical fiber units 1, the tension members 15, and the like. That is, inside the outer jacket 13, a pair of the tension members 15 are provided at positions facing each other with the cable core therebetween, and the ripcords 17 are provided in a direction approximately perpendicular to the facing direction of the tension members 15 so that the ripcords 17 face each other with the cable core therebetween.

Figure 6B:
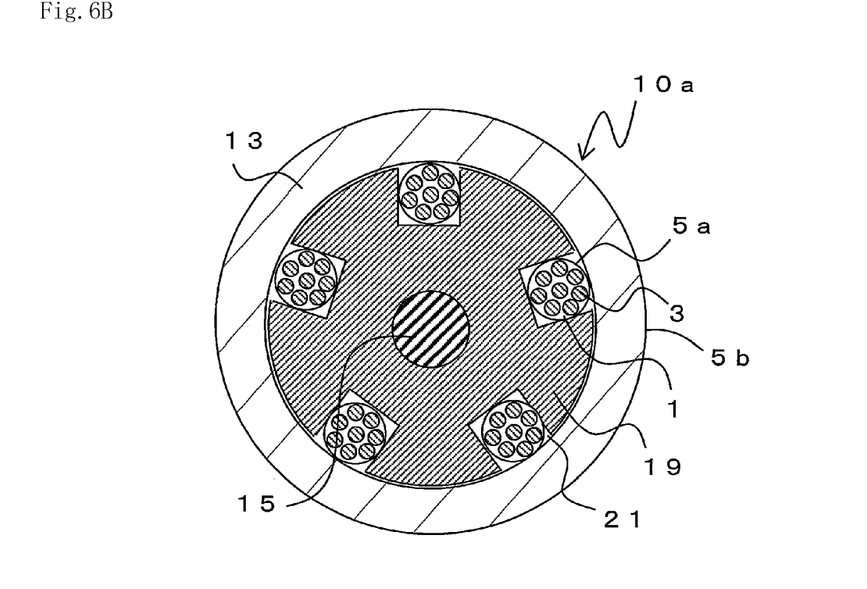

Also, in the present invention, instead of the optical fiber cable 10 shown in FIG. 6A, an optical fiber cable 10a having a slot shown in FIG. 6B, for example, may be applicable.

In the optical fiber cable 10a, the optical fiber units 1 are disposed in a plurality of slot grooves 21 formed on an outer periphery of a slot 19, respectively. The tension member 15 is provided at an approximately center of the slot 19, and the outer jacket 13 is formed after press winding is applied to the outer periphery of the slot 19 as necessary. Also in this case, the same effects as in the optical fiber cable 10 can be obtained.

As described above, according to the embodiments of the present invention, each of the bundle materials 5a, 5b is not spirally wound in the same direction and is provided on the outer periphery of the optical fibers 3 or the optical fiber ribbons 3a while inverting its winding direction back and forth. Thus, breaking the bonding portion 7 is easy and the optical fibers 3 inside can be taken out easily without rewinding the bundle materials 5a, 5b. Thus, the branching operation of the optical fibers 3 or the optical fiber ribbons 3a is easy.

Also, the length of the bonding portion 7 of the bundle materials 5a, 5b is between 5 mm and 20 mm, and this can prevent the bonding portions 7 from being detached during manufacturing and the like and can prevent the optical fibers from coming off due to the too long straight line of the bonding portion 7.

Also, the peeling strength of the bonding portion of the bundle materials is between 0.01N and 2.0N. Thus, the bonding portion 7 hardly detaches during manufacturing and the like, and, also, it is easy to peel off the bonding portion 7 in the branching operation.

Also, the bundle materials 5a, 5b are resin tape and the bonding portion 7 of the bundle materials 5a, 5b is bonded by heat fusion. Thus, the optical fiber units 1, 1a, 1b can be manufactured easily.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

Figure 7:
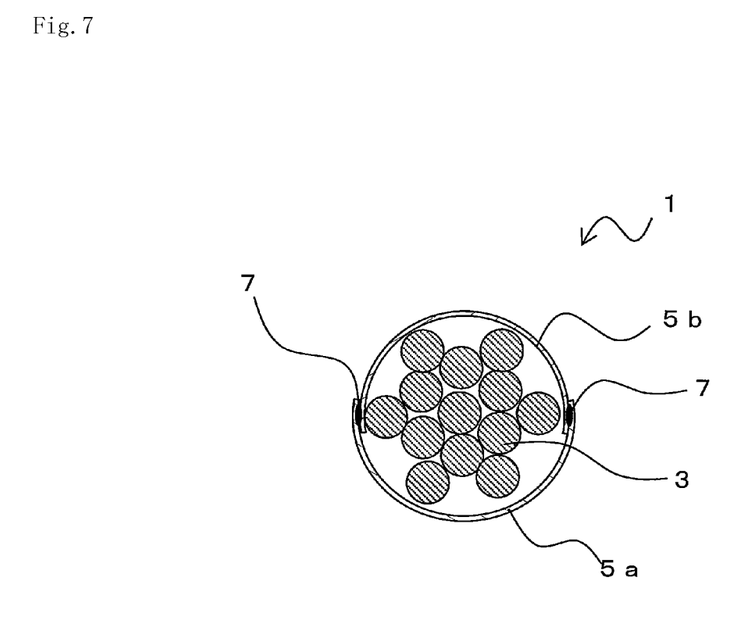
FIG. 7 is a cross sectional view showing the optical fiber unit 1.

For example, an upper-lower relationship (a position relationship between an outer periphery side and an inner periphery side) of the overlapped portion of the bundle materials 5a, 5b at the bonding portion 7, which is an intersection of the bundle materials 5a, 5b, is not limited to the above-mentioned example. In the present invention, as shown in FIG. 1B, the bundle material 5a may be disposed on the outer periphery side and the bundle material 5b may be disposed on the inner periphery side at the first bonding portion 7, while, in reverse, the bundle material 5b may be disposed on the outer periphery side and the bundle material 5a may be disposed on the inner periphery side at the second bonding portion 7. Alternatively, as shown in FIG. 7, the bundle material 5a may be disposed on the outer periphery side and the bundle material 5b may be disposed on the inner periphery side at both bonding portions 7. The same can be applied to the optical fiber units 1a, 1b.

What is claimed is:

1. An optical fiber unit, comprising:
a plurality of optical fibers; and
two bundle materials that are disposed on an outer periphery of the plurality of optical fibers, wherein:
neither of the bundle materials is spirally wound around the outer periphery of the optical fibers,
at least one of the bundle materials is twisted to wind around the outer periphery of the plurality of optical fibers while inverting its winding direction back and forth,
the bundle materials are bonded together at an intersection of the bundle materials,
a length of a bonding portion of the bundle materials is between 5 mm and 20 mm, and
a peeling strength of the bonding portion of the bundle materials is between 0.01 N and 2.0 N.

2. The optical fiber unit according to claim 1, wherein:
the two bundle materials are twisted to wind around the outer periphery of the plurality of optical fibers while inverting winding directions of the two bundle materials back and forth.

3. The optical fiber unit according to claim 1, wherein:
the bundle material is resin tape and the bonding portion of the bundle materials is bonded by heat fusion.

4. The optical fiber unit according to claim 1, wherein:
the optical fiber is an optical fiber ribbon.

5. An optical fiber cable, comprising:
a plurality of the optical fiber units of claim 1;
a tension member; and
an outer jacket that is provided on an outer periphery of the optical fiber units.

6. An optical fiber cable, comprising:
a plurality of the optical fiber units of claim 2;
a tension member; and
an outer jacket that is provided on an outer periphery of the optical fiber units.

7. An optical fiber cable, comprising:
a plurality of the optical fiber units of claim 3;
a tension member; and
an outer jacket that is provided on an outer periphery of the optical fiber units.

8. An optical fiber cable, comprising:
a plurality of the optical fiber units of claim 4;
a tension member; and
an outer jacket that is provided on an outer periphery of the optical fiber units.

9. A method for manufacturing an optical fiber unit, the method comprising steps of:
bonding a bundle material with the other at a bonding portion on a first side of optical fibers and moving the bundle materials and the optical fibers relatively in a direction perpendicular to a longitudinal direction of the optical fibers so that the optical fibers contact with the bonding portion on the first side and the bundle materials move to a second side of the optical fibers; and
bonding the bundle material with the other at the bonding portion on the second side of the optical fibers and moving the bundle materials and the optical fibers relatively in the direction perpendicular to the longitudinal direction of the optical fibers so that the optical fibers contact with the bonding portion on the second side and the bundle materials move to the first side of the optical fibers, wherein:
the steps are repeated while bundling a plurality of the optical fibers and continuously feeding two bundle materials around an outer periphery of the optical fibers,
a length of the bonding portion of the bundle materials is between 5 mm and 20 mm, and
a peeling strength of the bonding portion of the bundle materials is between 0.01 N and 2.0 N.

* * * * *